United States Patent
Horrer et al.

Patent Number: 6,163,605
Date of Patent: Dec. 19, 2000

[54] SERVICE UNIT FOR SUPPORTING THE ESTABLISHMENT OF CALLS, AS WELL AS SWITCHING CENTER, SERVICE CONTROL POINT, COMMUNICATIONS NETWORK, AND METHOD OF ESTABLISHING A CALL

[75] Inventors: Matthias Horrer, Raleigh, N.C.; Uwe Stahl, Leonberg; Wolfgang Lautenschlager, Weissach-Flacht, both of Germany

[73] Assignee: Alcatel, Paris, France

[21] Appl. No.: 09/022,162

[22] Filed: Feb. 11, 1998

[30] Foreign Application Priority Data

Feb. 21, 1997 [DE] Germany .......................... 197 07 039

[51] Int. Cl.$^7$ ...................................... H04M 3/42
[52] U.S. Cl. ........................... 379/210; 379/201; 379/207
[58] Field of Search ................................... 379/210, 211, 379/207, 201, 229

[56] References Cited

U.S. PATENT DOCUMENTS 5,465,295 11/1995 Furman ..................................... 379/211
5,467,390 11/1995 Brankley et al. ................. 379/93.14 X

FOREIGN PATENT DOCUMENTS 19542122  5/1996  Germany .
19515856  10/1996  Germany .
9641462  12/1996  WIPO .

OTHER PUBLICATIONS

"Mobilitat in privaten Telekommunikationsnetswerken (PTN)" by Mosimann et al, Das technische Magazin von ascom. pp. 14–20. No Translation.

"Network Interconnection and Gateways" by Sunshine, IEEE Journal on Selected Areas in Communications, Vo. 8, No. 1, Jan. 1990, pp. 4–11.

"Universal Personal Telecommunication (UPT) Concept and Standardisation" by J. Sundborg, Ericsson Review No. 4, 1993, pp. 140–154.

*Primary Examiner*—Creighton Smith
*Attorney, Agent, or Firm*—Ware, Fressola, Van Der Sluys & Adolphson LLP

[57] ABSTRACT

For the establishment of a call in a communications network (KN), one of two or more different subscriber identifications (UA) which all address the called subscriber (B) is sent from a terminal (T1) of a calling subscriber (A) to a service unit (SU) of the communications network (KN). The service unit (SU) accesses a database (DB) which manages different types of subscriber identifications (UA) and in which groups of two or more different subscriber identifications are assigned to one called subscriber (B) each. Via the database access, the service unit (SU) determines from the received subscriber identification (UA) a network address (RN) assigned to the called subscriber (B) which addresses a terminal (T2) of the called subscriber (B) in the communications network (KN). The call between the calling subscriber (A) and the called subscriber (B) is then established by means of the network address (RN).

13 Claims, 2 Drawing Sheets

SERVICE UNIT FOR SUPPORTING THE ESTABLISHMENT OF CALLS, AS WELL AS SWITCHING CENTER, SERVICE CONTROL POINT, COMMUNICATIONS NETWORK, AND METHOD OF ESTABLISHING A CALL

TECHNICAL FIELD

This invention relates to a service unit for supporting the establishment of calls between subscribers of a communications network, to a switching center of a communications network, to a service control point of a communications network, to a communications network, and to a method of establishing a call between a calling subscriber and a called subscriber of a communications network.

BACKGROUND OF THE INVENTION

In a conventional telephone network, a subscriber who wants to make a call to another subscriber normally dials the called subscriber's number. This number corresponds to the network address of the called subscriber's terminal in the telephone network and thus identifies directly a subscriber terminal of the network. During call establishment, the number is carried in the call request and is used in the switching centers of the telephone network directly for routing purposes and to locate the called subscriber.

This mode of addressing a subscriber in a communications network has disadvantages if the subscriber has two or more subscriber terminals. To be able to reach the called subscriber, the calling subscriber must know the numbers of all these terminals.

Concepts are known which permit addressing directed to the subscriber rather than the terminal, and thus overcome this disadvantage. Such a concept is described, for example, in an article by Jonas Sundborg, "Universal Personal Telecommunication (UPT) —Concept and Standardisation", Ericsson Review No. 4, 1993, pages 140 to 154.

In that concept, each subscriber is identified by a unique, network-transparent UPT number. The numbering scheme for the UPT numbers is standardized in E.168, the numbering structure being based on E.164, which is the recommendation for the ISDN numbering plan. The UPT number consists of three parts: a country code, a UPT service provider indicator, and a subscriber number.

During call setup, the UPT number is routed through the communications network to the UPT service provider, and the latter then determines that terminal via which the subscriber can be reached at the moment. The physical network address assigned to this terminal is determined and is then used to establish the call to the called subscriber. This network address is usually the number of the subscriber terminal determined.

With all these known methods of addressing a subscriber in a communications network, however, the problem arises that the calling subscriber must know a number specifically intended for this manner of communication with the called subscriber.

This problem will be aggravated as the number of means of communication (telephony, E-mail, address in different data networks) increases.

SUMMARY OF THE INVENTION

The object of the invention is to improve the reachability of a subscriber.

This object is attained by a service unit for supporting the establishment of calls between subscribers of a communications network, the service unit comprising a receiving unit for receiving different subscriber identifications which each address a called subscriber and are each routed from a calling subscriber to the service unit, the service unit further comprising, or being connected to, a database which manages the different types of subscriber identifications and in which groups of two or more different subscriber identifications are assigned to one called subscriber each, the service unit further comprising a first control unit which is adapted to assign to each of the two or more different subscriber identifications of a called subscriber, by access to the database, the same network address which addresses a terminal of the called subscriber in the communications network and permits the establishment of the call to the called subscriber.

The object is also attained by a switching center of a communications network comprising a service unit as described above which is incorporated in the switching center.

The object is still further attained by a service control point of a communications network which is connected to one or more switching centers of the communications network and comprises a service unit as described above.

The object is also attained by a communications network comprising a receiving unit for receiving different subscriber identifications which each address one called subscriber and are each routed from a calling subscriber to the receiving unit for establishing a call through the communications network, a database which manages different types of subscriber identifications and in which groups of two or more different subscriber identifications are assigned to one called subscriber each, and a first control unit which is adapted to assign to each of the two or more different subscriber identifications of a called subscriber, by access to the database, the same network address which addresses a terminal of the called subscriber in the communications network and permits the establishment of the call to the called subscriber.

The object is still further attained by a method of establishing a call between a calling subscriber and a called subscriber of a communications network wherein one of two or more different possible subscriber identifications which all address the called subscriber is sent from the terminal of the calling subscriber to a service unit, wherein the service unit accesses a database which manages different types of subscriber identifications and in which groups of two or more different subscriber identifications are assigned to one called subscriber each, wherein by means of the database access, the service unit determines from the received subscriber identification a network address assigned to the called subscriber which addresses a terminal of the called subscriber in the communications network, and wherein the call between the calling subscriber and the called subscriber is established by means of the network address.

The invention is based on the idea to assign to a subscriber two or more different subscriber identifications by all of which the subscriber can be addressed in a communications network. Thus, several subscriber identifications of different types (number combinations, letter combinations, E-mail syntax) are at the calling subscriber's disposal to reach the called subscriber.

Further advantageous features of the invention are defined in the subclaims.

Particularly advantageously, subscriber identifications are provided for a subscriber which are addresses assigned to the subscriber in another means of communication, such as the subscriber's E-mail address in a telephone network.

BRIEF DESCRIPTION OF THE DRAWINGS

The invention will become more apparent from the following description of two embodiments when taken in conjunction with the accompanying drawings, in which.

BEST MODE FOR CARRYING OUT THE INVENTION

In the first embodiment, the method according to the invention will be explained using a service unit according to the invention which forms part of a service control point according to the invention in a communications network according to the invention.

Figure 1:
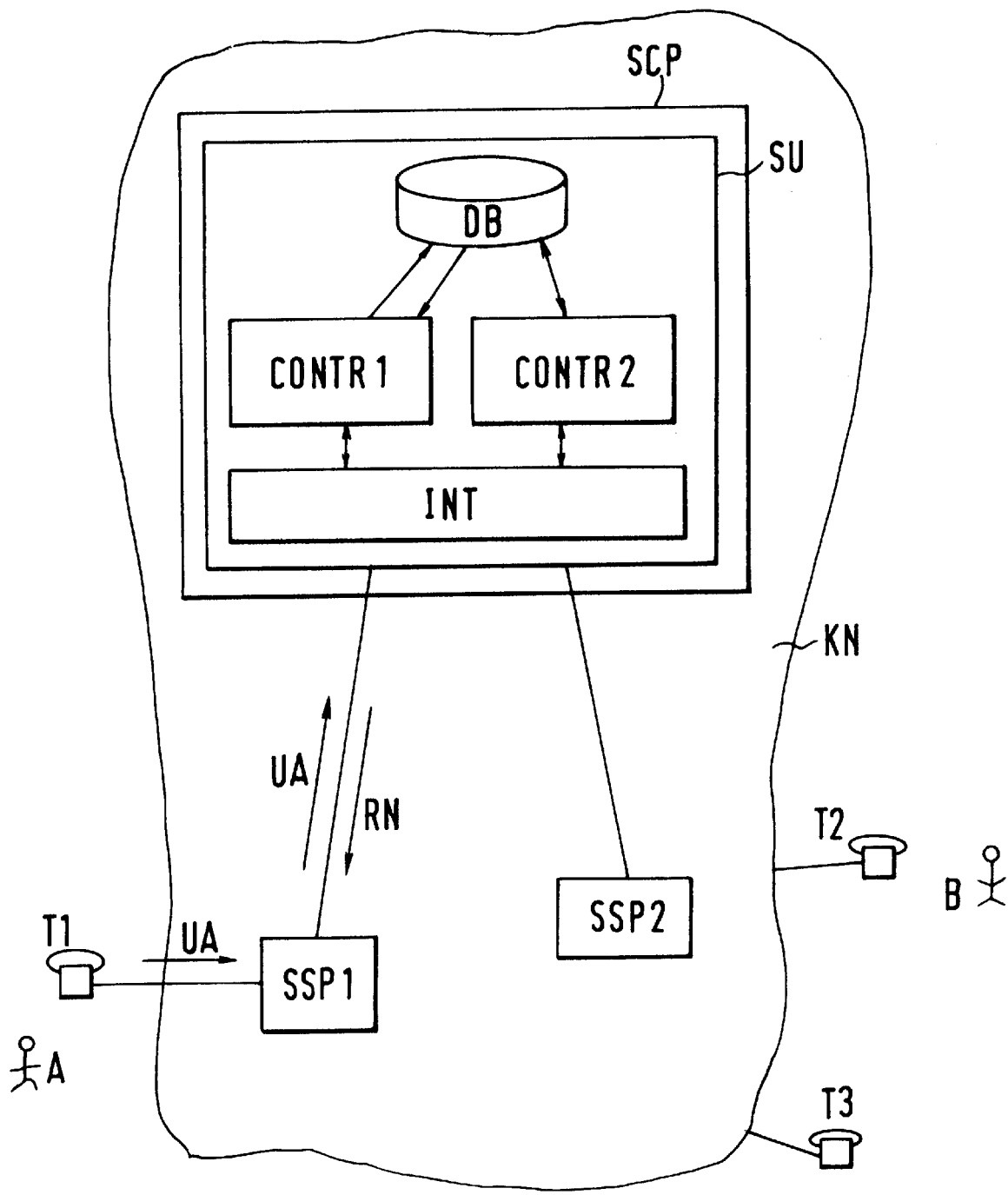
FIG. 1 is a block diagram of a communications system with a service control point according to the the invention.

FIG. 1 shows a communications network KN, three terminals T1 to T3 connected thereto, and a service control point SCP. The terminal T1 is assigned to a subscriber A, and the terminals T2 and T3 to a subscriber B.

The communications network KN is a public telephone network. It may also be formed by a plurality of communications networks of different subscriber access network, toll network, or mobile radio network operators, and thus represent a global telephone network. The communications network KN may also be a private network or include private communications networks.

Of the switching centers of the communications network KN, only two specifically designed switching centers SSP1 and SSP2 are shown in FIG. 1 by way of example. These switching centers are service switching points which, upon receipt of a specific service indicator or automatically, send inquiries to the service control point SCP and, in response thereto, receive from the service control point SCP control information relating to the further establishment of the call.

The service control point SCP provides services for the switching centers connected to it, here the switching centers SSP1 and SSP2. It is constituted by a computer platform with suitable peripheral components for communicating with the switching centers SSP1 and SSP2 on which one or more application programs are executed which control one service each. Such an application program, together with the underlying layers, forms a service unit which provides the service. of these service units, a service unit SU is shown in FIG. 1, which is a service unit in accordance with the invention.

Advantageously, the service switching centers SSP1 and SSP2 and the service control point SCP interact in accordance with the communications mechanisms and the functional division of the IN architecture (IN=intelligent network).

A call from subscriber A to subscriber B is established as follows:

Subscriber A sends a call request, together with a subscriber identification UA addressing subscriber B. via his/her terminal T1 to the communications network KN.

It is possible for subscriber A to use different types of subscriber identifications for addressing subscriber B. He/she may use a logic subscriber number assigned to subscriber B, an E-mail address assigned to subscriber B, a logic address assigned to subscriber B in a data network, or a postal address assigned to subscriber B. All these syntactically totally different addresses can be used by subscriber A as identification for subscriber B, with these addresses being assigned new semantics totally different from the original semantics, namely those of the addressing of subscriber B in the communications network KN.

It is also possible for subscriber A to use further address types or a selection from these or the above address types.

This call request, together with the subscriber identification UA, is routed through the communications network KN to the switching center SSP1, which passes the subscriber identification UA on to the service control point SCP.

The routing of the call request with the subscriber identification UA to the switching center SSP1 and the passing on of the subscriber identification UA are based on an indicator entered in the call request or on the detection of the subscriber identification UA. However, it is also possible to route all call requests automatically from the terminal T1 to the switching center SSP1, where they initiate an inquiry to the service control point SCP.

Advantageously, a specific indicator is provided in the call request which indicates whether this call request is to be treated as an ordinary call request with a subscriber number as a call request with a subscriber identification.

The service control point receives the subscriber identification UA and evaluates it. It ascertains the subscriber to whom the subscriber identification UA is assigned, and determines the network address of that subscriber terminal of the communications network KN via which this subscriber can be reached at the moment. In this example, this is the terminal T2 with a network address RN. The network address has such a form and such an information content that it can serve directly to select the path to this addressed subscriber terminal in the communications network KN. The network address thus has the form of an ordinary subscriber number for a telephone network, for example.

The subscriber identification UA may also contain semantically the information as to which service (e.g., telephone, fax) of the called subscriber is being addressed, which then requires a service-specific translation into a network address.

The network address RN is returned to the switching center SSP1. The latter enters the network address RN as a destination address in the call request and initiates the establishment of the call in the communications network KN by signaling this call request. The network address RN is used by the switching centers of the communications network KN directly to establish the routing to the terminal T2. The call between the terminal T1 and the terminal T2 is then established according to the path of the call request.

In the following, the functional design of the service unit SU and the call setup procedure are described in more detail.

The service unit SU contains a database DB, two control units CONTR1 and CONTR2, and an interface unit INT.

The interface unit INT serves to receive the subscriber identification UA and to perform the control functions for the reception of the subscriber identification UA from terminals connected to the communications network KN.

Since the interface unit INT has to receive different types of subscriber identifications, most of which differ from the standard data format specified for the transmission of the subscriber number in the communications network KN, it uses any of the following methods:

If the terminal T1 is an ISDN terminal (ISDN=Integrated Services Digital Network), the subscriber identification was entered in the signaling-data packet of the call request which is transported from the terminal T1 over the ISDN D channel to the switching center SSP1. The interface unit INT instructs the switching center SSP1 to extract the data relating to the subscriber identification from the signaling-data packet and to send this data to the interface unit.

It is also possible not to transport the subscriber identification UA in this signaling-data packet, but to send the subscriber identification in an additional data packet over the ISDN D channel from the terminal T1 to the switching center SSP1, and to transmit it from there transparently to the receiving unit INT. In that case, the receiving unit INT would control the transmission of this data packet by suitable control instructions. Furthermore, the receiving unit INT may request the terminal T1 to send data with the subscriber identification UA by causing the switching center SSP1 to send a corresponding request message over the ISDN D channel to the terminal T1.

If the terminal T1 is an analog terminal, the receiving unit, upon receipt of a call request with an indicator which indicates that the requested call is addressed by a subscriber identification, initiates the establishment of a user channel to the terminal T1. The subscriber identification UA is then sent from the terminal T1 in coded form over this established user channel to the switching center SSP1, where it is changed back to a digital format by a decoder. Such coding can be effected, for example, by several different tones as in the multifrequency dialing technique or by a coding method used in a modem for transmitting digital data over user channels.

It is also possible that the receiving unit initiates the request for the subscriber identification, e.g., by sending a corresponding recorded voice message.

Furthermore, the receiving unit may include a speech recognition unit which recognizes subscriber identifications spoken by subscriber A and converts them to digital form. Such speech coding is possible with both analog and ISDN terminals.

The receiving unit may also control a service support system (IP=Intelligent Peripheral) which is connected to the switching center and contains receiving, transmitting, coding, and speech recognition devices that support the communication between the receiving unit INT and the terminal T1.

The database DB has a data structure which makes it possible to assign two or more different subscriber identifications to a respective subscriber and then a network address to the subscriber.

A first way of doing this is to store in the database DB a mixed list of all subscriber identifications of all subscribers of the communications network KN, with each such list entry being assigned one network address.

A second possibility is to provide a separate list or a separate database for each type of subscriber identification, which results in a simplification of the data format.

A further possibility is to assign network addresses directly to subscriber identifications, which saves storage space but complicates a change of the network address assigned to a subscriber.

The database DB, instead of being located in the service control point SCP, may also form part of a computer system connected to the service control point via a communication link. It may also be a distributed database.

The control unit CONTR1, by accessing the database DB, assigns a network address to a subscriber identification received via the receiving unit INT.

A advantageous mode of operation of the control unit CONTR1 will now be explained with the aid of FIG. 2.

Figure 2:
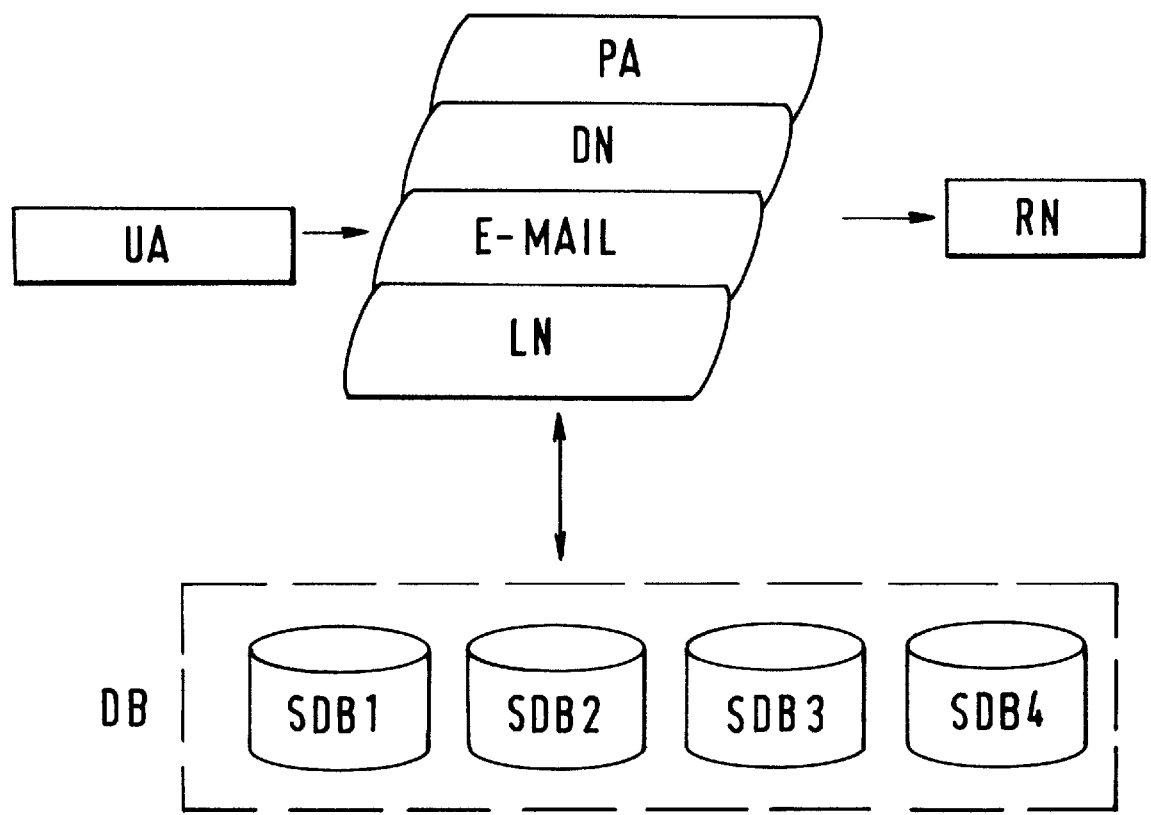
FIG. 2 is a symbolic representation of the operational sequence in the service control point of FIG. 1.

FIG. 2 shows the received subscriber identification UA, the determined network address RN, four functional modules PA, DN, E-MAIL, LN, and several subdatabases SDB1 to SDB4, which form the database DB.

First it is determined from the subscriber identification UA which type of subscriber identification the subscriber identification UA is assigned to. This can be ascertained from the syntax, i.e., the structure, of the subscriber identification, for example. It is also possible, however, that each subscriber identification contains an indicator which indicates which type of subscriber identification this specific subscriber identification is assigned to. By means of such an indicator, the type of identification can be determined in a simple manner.

Depending on the type of subscriber identification, i.e., whether the identification is the logic subscriber number, the E-mail address, the data network address, or the postal address of the called subscriber, branching into the functional module LN, E-MAIL, DN, or PA takes place. Each of these functional modules accesses an associated one of the subdatabases SDB1 to SDB4. Each of these subdatabases contains a list, arranged according to the(syntax ,of the respective subscriber identification, of all those subscriber identifications which are of this type and which are assigned to one of the subscribers of the communications network KN. This list is searched by the respective functional module using a search algorithm adapted tothe syntax-of the type of subscriber identifications stored therein.

The database DB, which contains a mixed list of subscriber identifications, may also be searched by the control unit CONTR1 for the received subscriber identification using a conventional search algorithm.

The control unit CONTR2 permits a subscriber to change the subscriber identification assigned to him/her in the database DB. To accomplish this, the control unit CONTR2 first carries out an authorization procedure in which a subscriber of the communications network KN who accesses the control unit identifies himself/herself by entering one of his/her subscriber identifications and a password. It is then possible for the subscriber to change the subscriber identifications relating to him/her in the database by menu selection or to establish new subscriber identifications or new types of subscriber identifications for him/her.

In a second embodiment, the construction of a switching center according to the invention will be explained.

Such a switching center contains, in addition to the usual functional groups, the functional groups of the service unit SU of FIGS. 1 an 2. Unlike the first embodiment, the functional separation between service switching point and service control point is eliminated. The service unit intervenes directly in the control of the switching center; it forms part of the control facility of the switching center.

Advantageously, the database DB is a centralized facility which can be accessed from several switching centers. The switching center according to the invention is advantageously the subscriber terminal exchange of subscriber A.

The first and second embodiments can also be applied to other types of communications networks. The communications network KN may also be a broadband, video, multimedia, or data network, for example.

What is claimed is:

1. A service unit (SU) for supporting the establishment of calls between subscribers (A, B) of a communications network (KN), the service unit (SU) comprising a receiving unit (INT) for receiving different subscriber identifications (UA) which permits receiving of different subscriber identifications (UA) having different syntaxes or data formats, each different subscriber identification (UA) addresses a called subscriber (B) and each subscriber identification is routed from a calling subscriber (A) to the service unit (SU), wherein the service unit (SU) translates each subscriber identification having a different syntax or data format into a communications network (KN) compatible address, the service unit (SU) further comprising, or being connected to, a database (DB) which manages different types of subscriber identifications (UA) having different syntaxes or data formats and in which groups of two or more different subscriber identifications (UA) are assigned to one called subscriber (B) each, the service unit (SU) further comprising a first control unit (CONTR1) which assigns to each of the two or more different subscriber identifications (UA) of different syntaxes or data formats of a called subscriber, by access to the database (DB) one network address (RN) which addresses a terminal (T2) of the called subscriber (B) in the communications network (KN) and permits the establishment of the call to the called subscriber (B).

2. A service unit (SU) as claimed in claim 1, characterized by further comprising a second control unit (CONTR2) which is adapted to permit the called subscriber (B) to change the different subscriber identifications (UA) assigned to said called subscriber in the database (DB).

3. A switching center of a communications network comprising a service unit as claimed in claim 1 wherein functions of the service unit are incorporated in the switching center.

4. A service control point (SCP) of a communications network (KN) which is connected to one or more switching centers (SSP1, SSP2) of the communications network (KN) and comprises a service unit (SU) as claimed in claim 1.

5. A service control point (SCP) as claimed in claim 4, characterized by being a service control point according to an IN (Intelligent Network) architecture.

6. A communications network (KN) comprising a receiving unit (INT) for receiving different subscriber identifications (UA) which permits receiving of the different subscriber identifications (UA) having different syntaxes each subscriber identification (UA) addresses one called subscriber (B) and each subscriber identification is routed from a calling subscriber (A) to the receiving unit (INT) for establishing a call through the communications network (KN), a database (DB) which manages different types of the different subscriber identifications (UA) having different syntaxes and in which groups of two or more of the different subscriber identifications (UA) are assigned to one called subscriber (B) each, and a first control unit (CONTR1) assigns to each of the two or more different subscriber identifications (UA) of a called subscriber, by access to the database (DB) and by performing a translation of the subscriber identifications (UA) having different syntaxes to a format used by the communications network (KN), one network address (RN) which addresses a terminal (T2) of the called subscriber (B) in the communications network (KN) and permits the establishment of the call to the called subscriber (B).

7. A method of establishing a call between a calling subscriber (A) and a called subscriber (B) of a communications network (KN) wherein one of two or more different subscriber identifications (UA), of many different possible syntaxes or data formats, which all address the called subscriber (B) is sent from a terminal (T1) of the calling subscriber (A) to a service unit (SU), wherein the service unit (SU) accesses a database (DB) which manages the different subscriber identifications (UA) and in which groups of two or more of the different subscriber identifications (UA) are assigned to one called subscriber (B) each, wherein by means of the database access, the service unit (SU) determines from reception of the subscriber identifications (UA) a network address (RN) assigned to the called subscriber (B) by performing a translation from the different subscriber identifications (UA) of many possible syntaxes or data formats to a format used by the communications network (KN), and which addresses a terminal (T2) of the called subscriber (B) in the communications network (KR), and wherein the call between the calling subscriber (A) and the called subscriber (B) is established by means of the network address (RN).

8. A method as claimed in claim 7, characterized in that the service unit (SU) determines the type of the received subscriber identification (UA) and, depending on the type of subscriber identification (UA) received, accesses a type-specific subdatabase (SDB1 to SDB4).

9. A method as claimed in claim 8, characterized in that the service unit (SU) evaluates a first indicator of the received subscriber identification (UA), which indicates the type of the subscriber identification.

10. A method as claimed in claim 7, characterized in that a first type of subscriber identifications (UA) is formed syntactically like a postal address (PA).

11. A method as claimed in claim 7, characterized in that a second type of subscriber identifications (UA) is formed syntactically like an electronic-mail address (E-MAIL).

12. A method as claimed in claim 7, characterized in that a third type of subscriber identifications (UA) is formed syntactically like a logical subscriber number (LN).

13. A method as claimed in claim 7, characterized in that in the communications network, a second indicator is evaluated which indicates whether a call request contains a subscriber identification or a network address.

* * * * *

UNITED STATES PATENT AND TRADEMARK OFFICE
CERTIFICATE OF CORRECTION

PATENT NO. : 6,163,605
DATED : December 19, 2000
INVENTOR(S) : Matthias Horrer, Uwe Stahl and Wolfgang Lautenschlager It is certified that error appears in the above-identified patent and that said Letters Patent is hereby corrected as shown below:

Column 8,
Line 25 (claim 7, line 19), "(KR)" should be -- (KN) --.

Signed and Sealed this

Twenty-third Day of October, 2001

Attest:

NICHOLAS P. GODICI
Attesting Officer     *Acting Director of the United States Patent and Trademark Office*